US012574794B2

(12) United States Patent　　　　　　(10) Patent No.:　US 12,574,794 B2
Welle　　　　　　　　　　　　　　　　　(45) Date of Patent:　Mar. 10, 2026

(54) METHOD FOR CONTROLLING AND/OR OPERATING AN AUTOMATION COMPONENT

(71) Applicant: VEGA Grieshaber KG, Wolfach (DE)

(72) Inventor: Roland Welle, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 374 days.

(21) Appl. No.: 18/252,901

(22) PCT Filed: Nov. 19, 2020

(86) PCT No.: PCT/EP2020/082743

§ 371 (c)(1),
(2) Date: May 15, 2023

(87) PCT Pub. No.: WO2022/106010

PCT Pub. Date: May 27, 2022

(65) Prior Publication Data

US 2024/0103499 A1　　　Mar. 28, 2024

(51) Int. Cl.
H04W 28/02　　　　(2009.01)
G05B 19/418　　　(2006.01)
(Continued)

(52) U.S. Cl.
CPC ................... H04W 28/0268 (2013.01); G05B 19/41855 (2013.01); H04W 28/0236 (2013.01);
(Continued)

(58) Field of Classification Search
CPC ......... H04W 28/0268; H04W 28/0236; H04W 84/12; H04W 88/06; G05B 19/41855;
(Continued)

(56) References Cited

U.S. PATENT DOCUMENTS 11,118,938 B2　　9/2021　Schmidt et al.
2009/0326683 A1　12/2009　Gerstmaier et al.
(Continued)

FOREIGN PATENT DOCUMENTS

DE　　10 2007 007 537 A1　　8/2008
DE　　10 2009 009 189 B4　　6/2011
(Continued)

OTHER PUBLICATIONS

Office Action mailed Dec. 7, 2023, in co-pending U.S. Appl. No. 17/455,358.
(Continued)

*Primary Examiner* — Michael J Brown
(74) *Attorney, Agent, or Firm* — Oblon, McClelland, Maier & Neustadt, L.L.P.

(57) ABSTRACT
A method for controlling and/or operating an automation component of automation technology using a service of the automation technology. The service is analyzed by a control circuit of an automation component while determining at least one property of the service. Based on the at least one determined property of the service, one of the at least two mobile interfaces of the automation component with the control circuit is determined and/or controlled to process the service.

19 Claims, 3 Drawing Sheets

(51) Int. Cl.

| | | |
|---|---|---|
| *H04W 84/12* | (2009.01) | |
| *G05B 19/042* | (2006.01) | |
| *H04W 88/06* | (2009.01) | |

(52) U.S. Cl.
CPC ...................... *H04W 84/12* (2013.01); *G05B 2219/25196* (2013.01); *G05B 2219/25283* (2013.01); *H04W 88/06* (2013.01)

(58) Field of Classification Search
CPC ........... G05B 2219/25196; G05B 2219/25283; G05B 19/4185; G05B 2219/25291; G05B 2219/25424; G05B 2219/33192; G05B 19/042; G05B 2219/25428; G05B 2219/31121; G05B 2219/31457; Y02P 90/02
USPC ........................................................ 700/95
See application file for complete search history.

(56) References Cited

U.S. PATENT DOCUMENTS

| | | | |
|---|---|---|---|
| 2011/0299470 | A1 | 12/2011 | Mueller et al. |
| 2014/0364164 | A1* | 12/2014 | Griffin ................. H04B 1/3827 455/550.1 |
| 2016/0170394 | A1 | 6/2016 | Allgaier et al. |
| 2019/0234640 | A1 | 8/2019 | Nemcek et al. |
| 2019/0335379 | A1 | 10/2019 | Joseph et al. |
| 2020/0053792 | A1 | 2/2020 | Ryu et al. |
| 2020/0196031 | A1 | 6/2020 | Joppich-Dohlus et al. |
| 2020/0252867 | A1 | 8/2020 | Welle et al. |
| 2020/0329529 | A1 | 10/2020 | Tsai et al. |
| 2020/0344566 | A1 | 10/2020 | Argo |
| 2021/0160800 | A1* | 5/2021 | Al Qaisi ................. H04L 69/18 |
| 2021/0176697 | A1 | 6/2021 | Lu et al. |

FOREIGN PATENT DOCUMENTS

| | | |
|---|---|---|
| DE | 10 2011 086 726 A1 | 5/2013 |
| DE | 10 2018 009 818 A1 | 6/2020 |
| DE | 10 2018 009 821 A1 | 6/2020 |
| EP | 2 311 180 A1 | 4/2011 |
| EP | 3 690 565 A1 | 8/2020 |
| WO | WO 2020/126288 A1 | 6/2020 |

OTHER PUBLICATIONS

International Preliminary Report on Patentability with Written Opinion issued on Jun. 1, 2023 in PCT/EP2020/082743 filed on Nov. 19, 2020, 7 pages.

German Office Action issued on Sep. 15, 2021 in German Patent Application No. 10 2020 130 622.9, 7 pages.

* cited by examiner

METHOD FOR CONTROLLING AND/OR OPERATING AN AUTOMATION COMPONENT

REFERENCE TO RELATED APPLICATIONS

This application claims priority from International Patent Application No. PCT/EP2020/082743, filed Nov. 19, 2020, which is incorporated herein by reference in its entirety.

FIELD OF INVENTION

The invention relates generally to the field of automation technology, process automation and/or factory automation. In particular, the invention relates to a method for controlling and/or operating an automation component of automation technology, a computer program, a computer-readable medium, an automation component, a control system of automation technology, and the use of such an automation component or control system.

TECHNICAL BACKGROUND

Modern production plants are characterized by a high degree of automation. Extensive and comprehensive automation of processes and procedures in industrial plants can thereby lead to a consistently high quality of the goods produced and improve productivity in many subsectors of the global economy.

In this context, automation technology is often defined as a subfield of technology that includes all measures for operating machines and systems without the involvement of humans. Automation technology components or automation components regularly have a wired interface for supplying the circuits of the component with electrical energy and/or an electrical interface for exchanging information and data with surrounding components, sensors and/or actuators. Standardized communication interfaces adapted to the requirements of the respective automation system have become widespread in this area.

Known sensors in automation technology, process automation and/or factory automation can be equipped and operated with different communication technologies. In particular, wired automation devices are widely used, which can be connected wirelessly to a portable operating device, such as a smartphone, via a near-field interface (Bluetooth, Zigbee or others). This simplifies processes during commissioning or maintenance of the devices in particular. Automation devices or components that use a wireless interface to continuously transmit measured values or control signals to a receiver, such as another automation component, are also used. Status information, such as health data of an automation component, can also be transmitted wirelessly to a receiver, such as an asset management unit, at certain time intervals.

SUMMARY OF THE INVENTION

Embodiments of the present invention can advantageously provide an improved method for controlling and/or operating an automation component of automation technology, as well as a corresponding automation component and a corresponding control system.

This is made possible in particular by the objects of the independent patent claims. Further embodiments of the inventions result from the subclaims and the following description.

The following description equally concerns a method for controlling and/or operating an automation component of automation technology, a computer program, a computer-readable medium, an automation component, a control system of automation technology as well as the use of such an automation component and/or such a control system. In other words, features, elements, steps and/or functions which are described below with reference to the method apply equally to the computer program, the computer-readable medium, the automation component, the control system, as well as the use of an automation component and/or a control system, and vice versa.

A first aspect of the present disclosure relates to a method for controlling and/or operating an automation component of automation technology, such as process automation, factory automation, and/or logistics automation. The automation component comprises a control circuit and at least two mobile radio interfaces. The method comprises the following steps:

Providing a service of automation technology,

Analyzing the service by the control circuitry while determining and/or ascertaining at least one characteristic of the service, Determining and/or driving, with the control circuitry and based on the at least one particular characteristic of the service, one of the at least two mobile interfaces for at least partially processing the service for at least partially processing the service and/or for performing at least part of the service.

In particular, the method according to the invention can enable different automation technology services to be processed and/or performed in an optimized, efficient and flexible manner. Sometimes this can enable flexible adaptability of the automation component to different conditions, processes, circumstances and/or operating phases as well as correspondingly optimized operation of the automation component.

The automation component may generally be any automation technology device. For example, the automation component can be an automation device, a control component, a process automation component, a programmable logic controller ("PLC"), a field device, a control unit, a server, a data processing device, a sensor, an actuator, an actuator, an operating device, a mobile operating device, a tablet, a notebook, a smartphone, a gateway, an expansion module, an add-on module or the like. For example, however, the automation component may also be a level measuring device for detecting a level of a medium, such as in a container, a radar level measuring device, a pressure measuring device for detecting a pressure of a medium, and/or a flow measuring device for detecting a flow of a medium.

Optionally, the automation component may be a module or extension module that can be attached to a sensor and/or coupled to a sensor, in particular mechanically and/or communicatively coupled. A mechanical coupling of such an extension module can, for example, take place via a snap mechanism, a clip mechanism, a hook mechanism, a magnetic coupling mechanism or the like. A communicative coupling between the sensor and the extension module can be performed via one of the at least two mobile radio interfaces. Such an automation component designed as an expansion module can be used to advantageously expand an existing sensor or field device with at least one of the mobile radio interfaces.

It is conceivable, for example, that the sensor or field device communicates with the expansion module or automation component via near field communication (NFC). Such near field communication can be particularly advantageous for data transmissions with a low data transmission rate and/or relatively low data volume to be transmitted. Furthermore, it is conceivable that the automation component provides the field device with a second mobile radio interface for data transmission with a high data transmission rate and/or relatively large data volume to be transmitted, such as an LORA interface, a 3G, 4G, 5G interface or the like.

It is conceivable, for example, that the automation component further comprises a signal display. Such a signal display may, for example, inform a user which of the at least two cellular interfaces is designated and/or controlled. Further, such a signal indicator may indicate the provided service of the automation component, so that the user is informed which service is being processed. Further data or information, such as a measured value, status information and/or health data may also be output via the signal display. Alternatively or additionally, the automation component may include control elements. For example, determining and/or controlling one of the at least two mobile interfaces may be based at least in part on input from a user.

The control circuit can generally be a control unit and/or an electronic component of the automation component. For example, the control circuit may be set up for data processing and/or have one or more processors. To this end, the control circuit may comprise one or more processors, for example. In the context of the present disclosure, the control circuit may denote a selection unit, a mobile radio selection device, and/or a mobile radio interface circuit. In particular, the control circuit may be arranged to analyze, evaluate, interpret, examine, and/or study the provided automation technology service. Further, the control circuit may be adapted to select, define, determine, control, and/or direct one of the plurality of cellular interfaces to process the service.

The step of analyzing the service of the automation technology may comprise determining and/or ascertaining one or more properties of the service. For example, data and/or information representative of the service, such as a control command to perform the service, may be processed by the control circuitry, wherein one or more properties of the service may be derived from the information and/or data. Optionally, the step of analyzing the service may include, for example, a step of associating the service with a subfield of automation technology. For example, the service may be associated with the subfield of factory automation, logistics automation, and/or process automation. Optionally, one or more properties of the service may further be determined which are related to the particular subfield.

The step of determining and/or actuating one of the at least two cellular interfaces with the control circuitry may further comprise actuating, directing, activating, and/or actuating one of the at least two cellular interfaces. Which of the at least two cellular interfaces is used to process the service may depend on one or more particular characteristics of the service. It may also be provided to actuate both of the at least two mobile radio interfaces, either simultaneously or sequentially, to process the service.

In particular, the mobile radio interface that appears to be most suitable for the service and/or in view of further boundary conditions, such as an available energy stint, can be determined and/or controlled in this way. This may mean that based on one or more characteristics of the service, it may be decided which of the at least two cellular interfaces should be used to process the service, for example to meet certain requirements of the service. However, the selection of the cellular interface(s) may also take into account other aspects, such as an operational phase of the automation component, an available energy workload, or the like.

In the context of the present disclosure, a mobile radio interface may denote a communication module, a communication interface, and/or a data transmission interface using mobile radio technology. Each of the mobile radio interfaces may thereby operate according to one or more communication standards or mobile radio standards, such as 1G, 2G, 3G or GSM, 4G or UMTS, 5G or IoT, Sigfox, Waviot, RPMA, NB-IoT, LTE-M or CAT-M1.

Optionally, the automation component may also have one or more wired interfaces and/or one or more wireless interfaces, such as a bus, two-wire, HART, LoRa, Profibus, FF, WLAN, network, USB, a Bluetooth interface, or any other interfaces.

The term "service" is to be understood broadly in the context of the present disclosure. In particular, it may be understood to mean any type of service, operational action, task, command, instruction, instruction, action, and/or operational process that is to be performed by one or more automation components in the context of automation technology. For example, a service can be a determination of a measured value, a transmission of a measured value, a reception of a measured value, a transmission of data, a reception of data, a control of an actuator, a control of another automation component, a fault diagnosis, a control/regulation of a valve, controlling a pump, controlling a drive, performing a control command, performing a task, performing a software update, displaying information, displaying data, processing data, processing a command, or any other service.

The property of the service, in the context of the present disclosure, may be a characteristic of the service and/or a criterion related to the performance of the service. For example, the characteristic of the service may be a parameter, a feature, a condition for performing the service, a condition associated with performing the service, an instruction for performing the service, a way of processing the service, or the like. The property of the service may alternatively or additionally specify a type of the service, such as a request for information/data and/or a query for information/data. In other words, the property of the service may serve to classify, classify, characterize, and/or generally describe the service.

The processing of the service may generally be the performance and/or execution of at least part of the service. For example, if the service is "perform fault diagnosis", the processing may consist of performing the fault diagnosis on the device in question, such as on a sensor, an actuator or on the automation component itself, and receiving data, such as diagnostic data, from a receiver and/or transmitting data to a receiver via the specified at least one mobile radio interface as part of the processing.

In the context of the present disclosure, determining and/or controlling the at least one mobile radio interface for processing the service can thus mean that the at least one mobile radio interface is at least partially involved in performing the service. However, this does not necessarily mean that the service is processed or performed by the at least one mobile radio interface, although this is certainly possible. It is conceivable, for example, that the at least one interface is only involved in the transmission, a reception and/or a sending of data and/or signals as part of the execution of the service.

In the context of the present disclosure, automation technology can be defined as a subfield of technology which includes all measures for operating machines and systems without the involvement of humans. Components of automation technology or automation components can, for example, have at least one wired interface for supplying the circuits of the component with electrical energy and at least one further electrical interface for exchanging information with surrounding control components, sensors and/or actuators. Standardized communication interfaces adapted to the requirements of the respective automation system, such as interfaces with a special communication standard, have found widespread use in this area.

Process automation, as a first subfield of automation technology, can have a relatively low degree of automation. The aim of process automation can be to automate the interaction of the components of an entire plant, for example in the chemical, petroleum, paper, cement, shipping or mining industries. For this purpose, a variety of sensors can be used, which can be adapted in particular to the specific requirements of the process industry, such as mechanical stability, insensitivity to contamination, extreme temperatures, extreme pressures. The measured values of these sensors can be transmitted to a control room, for example, which monitors process parameters such as filling level, flow rate, pressure and/or density and/or by which settings for the entire plant can be changed manually or automatically. Wired digital communication interfaces, such as HART interfaces, Profibus or FF, can enable secure transmission of small data packets in harsh industrial environments over long distances, optionally limiting the energy used by the communication partners to meet explosion safety requirements.

A second subfield of automation technology concerns factory automation and safety technology. Use cases for this can be found in a wide variety of industries such as automotive manufacturing, food production, the pharmaceutical industry or generally in the field of packaging. The goal of factory automation can be to automate the production of goods by machines, production lines and/or robots, i.e. to let it run without the participation of humans. The wired digital communication interfaces usually used for this purpose can aim to transfer large amounts of data from a data source to a data sink in an extremely short time, for example with a predefined maximum runtime, latency and/or latency time. Since often only relatively short distances have to be bridged and, in addition, no requirements with regard to explosion safety have to be taken into account, standards such as Industrial Ethernet or Ethercat can be used, which have a higher power requirement but are suitable for controlling and regulating time-critical systems and processes due to their real-time capability.

A third subfield of automation technology is logistics automation. Typical applications of logistics automation systems are in the field of baggage and freight handling at airports, in retailing, parcel distribution or also in the field of vendor managed inventory, in which consumer goods are automatically delivered by a supplier to a predefined stock level at the customer. The task of logistics automation components can be, for example, to transmit characteristic values of transported goods, such as filling level, temperature, location or humidity, to an evaluation base at predefinable time intervals, whereby the data is not used for the immediate control of a process, and thus a greater time delay between the time of sending a measurement or status value and the time of receiving a measurement or status value can be tolerated. Because logistics automation components have a high degree of mobility in a wide range of applications, battery-powered, wireless automation components have proven to be particularly advantageous. This gives rise to the need to use particularly energy-saving communication interfaces with a long range. At this point, well-known sensors use wireless communication standards such as Bluetooth LE, LoRa (Long Range Wide Area Network), Wireless HART or other low power standards to transmit data.

The invention can be considered to be based in particular on the findings described below. As described above, previous components of automation systems or conventional automation components have application-dependent, wireless or wired communication interfaces to meet special requirements of the respective target market. Such interfaces can be used, for example, to provide the basic, first service of an automation component, such as determining and/or transmitting a measured value in the case of a sensor, executing a control function in the case of a PLC and/or also executing an action in the case of an actuator, to the outside world and, for example, to be used by other components of the automation system.

By providing at least two wireless interfaces according to the invention and determining and/or controlling at least one of them for processing the service based on a determined property of the service, automation components can be extended with new, complementary services, which can provide added value for the users of such devices. This can be particularly advantageous with respect to wireless provisioning and/or service delivery. This in turn can enable integration of automation components into a globally available cloud through globally supported technologies, such as globally available mobile technology.

The automation component according to the invention with at least two mobile radio interfaces can advantageously support and/or enable different objectives in automation technology during different operating phases of the automation component. The at least two mobile radio interfaces can thereby combine different aspects of mobile radio standards and/or different mobile radio standards.

For example, a first service may be provided via a first cellular interface and a second service, which may be different from the first service, may be provided via a second cellular interface, which may be different from the first cellular interface. Thus, determining and/or controlling one of the interfaces for processing may include providing it via the respective interface. The first service may be, for example, a primary service and/or a basic function of the automation components, such as determining and/or transmitting a measured value, performing a control function, and/or performing an action on an actuator. The second service may be a secondary function of the automation component, such as performing a software update, providing diagnostic data, and/or providing status information.

Aspects of the present disclosure may further relate to providing a cloud interface that may be arranged to retrieve the first service of a first automation component via a first cellular interface and a second service of the first automation component via a second cellular interface. Alternatively or additionally, the present disclosure may relate to providing a software component that may be arranged to execute on a second automation device, a stationary or mobile personal computer, a server, and/or a portable operator device (e.g., smartphone) to use such a cloud interface to communicate with a first automation component according to the invention.

According to one embodiment, the step of providing the automation technology service comprises receiving, sending, and/or retrieving the service. For example, the service may be sent by the automation component to a receiver, such as a sensor, another automation component, a measurement device, a field device, a server, and/or a user interface. Alternatively or additionally, the service may be received by the automation component, such as by another automation component, such as a sensor, a measuring device, a field device, a server, and/or a user interface.

According to one embodiment, the step of analyzing the service comprises determining a predetermined, defined and/or preferred latency, latency time and/or runtime for the processing of the service. Alternatively or additionally, the at least one particular characteristic of the service comprises a latency, latency time and/or runtime predetermined, defined and/or preferred for processing the service. The latency, latency time and/or runtime may refer to a data transmission occurring in the course of the processing of the service. The latency, latency time and/or runtime may be specified by the service, for example. For example, it may be a preferred, expected, and/or required latency for the service. Thus, a mobile radio interface can be determined and/or controlled that can perform the processing of the service such that the actual latency during processing is less than or equal to the predetermined, preferred, tolerated, expected and/or required latency.

For example, the service or the processing of the service may require a user action and/or interaction with a user. In such a service, a certain (e.g., minimum) latency, latency time, and/or runtime may be desired and/or required for a data transmission occurring as part of processing the service. Based on the analysis of the service, the control circuitry may, for example, determine the latency and compare it to one or more metrics representative of a latency, latency, and/or delay possible with each of the cellular interfaces. Based on the comparison, the control circuitry may drive the cellular interface using which the actual latency, latency time, and/or propagation time is less than or equal to the predetermined latency, latency time, and/or propagation time of the service determined as a characteristic of the service by the control circuitry. The one or more characteristics representative of a latency, latency time, and/or runtime possible with each of the mobile interfaces may, for example, be stored in a memory of the automation component and/or retrieved and/or received from another data source, such as a server and/or a control device. Optionally, another of the at least two mobile radio interfaces can be used to process the service, for example in the event that the mobile radio interface intended for processing the service (initially) is not available.

According to one embodiment, the step of determining the property of the service comprises determining whether processing the service comprises and/or requires a user action and/or user interaction.

According to one embodiment, the step of analyzing the service comprises a step of determining a predetermined amount of data to be transmitted for processing the service. Alternatively or additionally, the at least one determined characteristic of the service comprises an amount of data predetermined for processing the service. The amount of data to be transmitted may comprise a data transmission from a transmitter to the automation component and/or a data transmission from the automation component to a receiver. According to the determined data quantity, the control circuit can select one of the at least two mobile radio interfaces for processing. For this purpose, the control circuit can, for example, compare the determined data quantity with at least one threshold value, for example for a data quantity to be transmitted and/or for a data transmission rate, and/or at least one characteristic variable for each mobile radio interface and, based on the comparison, control that mobile radio interface which is suitable for transmitting the determined data quantity. Such threshold values and/or parameters can, for example, be stored in a memory of the automation component and/or retrieved and/or received from another data source, such as a server and/or an operating device.

For a "software update" service, for example, large amounts of data may have to be transmitted, so that the mobile communications interface that can transmit a sufficiently large amount of data and/or has a sufficiently large data transmission rate is preferably selected for this purpose.

According to one embodiment, the step of analyzing the service comprises determining a data throughput and/or a data transfer rate predetermined for processing the service. Alternatively or additionally, the at least one determined characteristic of the service comprises a data throughput predetermined for processing the service and/or a data transfer rate. In the step of analyzing the service, it may be determined, examined, or ascertained what data throughput and/or data transfer rate may be preferred, desired, required, and/or necessary for processing the service. According to the determined data throughput and/or a data transmission rate, the control circuit can select one of the at least two mobile radio interfaces for processing. For this purpose, the control circuit can, for example, compare the determined data throughput and/or the determined data transmission rate with at least one characteristic variable which is representative of a data throughput and/or a data transmission rate possible with each of the mobile radio interfaces. Based on the comparison, the control circuitry can drive the mobile radio interface using which the actual data throughput and/or the actual data transfer rate is greater than or equal to the data throughput predetermined for processing the service and/or the data transfer rate predetermined for processing the service. In this way, it can be ensured that the mobile radio interface suitable for the respective service is always controlled. The at least one parameter which is representative of a possible data throughput and/or a possible data transmission rate with each of the mobile radio interfaces can, for example, be stored in a memory of the automation component and/or retrieved and/or received from another data source, such as a server and/or an operating device.

According to one embodiment, the step of analyzing the service comprises a step of determining a predetermined energy requirement for processing the service. Alternatively or additionally, the at least one determined characteristic of the service comprises a predetermined energy requirement for processing the service. In other words, based on an analysis of the service, the control circuitry may determine an energy demand required for processing the service. This may enable energy-efficient operation of the automation component. For this purpose, the control circuit may, for example, compare the determined energy requirement with at least one characteristic representative of an energy requirement of each mobile radio interface. Based on the comparison, the control circuit can control the mobile radio interface that is suitable for processing the service for energy reasons, for example is most energy efficient. The at least one parameter that is representative of the energy requirements of each mobile radio interface may, for example, be stored in a memory of the automation component and/or retrieved and/or received from another data source, such as a server and/or a control device.

Optionally, the control circuitry may also determine an amount of energy available to the automation component and/or an amount of energy available. For example, the automation component may have an energy storage device, such as a battery and/or an accumulator, and the control circuit may determine the amount of energy available in the energy storage device. Based on a comparison of the determined energy demand and the amount of energy available, the control circuitry may control a cellular interface using which the actual energy demand required to process the service is less than or equal to the amount of energy available. Alternatively or additionally, it can be provided that, above a certain threshold value for the amount of energy available, the mobile radio interface is selected which, when used, requires the least energy for processing the service compared to the other mobile radio interfaces.

According to one embodiment, the step of analyzing the service comprises a step of determining one or more frequencies predetermined for the processing of the service and/or at least one frequency range predetermined for the processing of the service. Alternatively or additionally, the at least one determined characteristic of the service comprises at least one frequency predetermined for processing the service and/or at least one frequency range predetermined for processing the service. For this purpose, the control circuit may, for example, compare the determined frequency ranges and/or frequencies with at least one characteristic representative of one or more transmission frequencies and/or transmission frequency ranges of each of the mobile radio interfaces. Based on the comparison, the control circuitry may drive the mobile radio interface whose transmission frequency(s) and/or transmission frequency range(s) substantially correspond to the frequency ranges and/or frequencies determined for the service. Such characteristic(s) may also be stored in a memory of the automation component, for example, and/or retrieved and/or received from another data source, such as a server and/or an operating device.

For example, to determine one or more frequencies and/or predetermined frequency range to be used for processing the service, a range to be achieved, such as when sending a signal when processing the service, may be determined. For example, the service may prefer transmission of fewer bytes over long distances while maintaining excellent building penetration. Such services may thus require a predetermined frequency range or frequencies suitable for the aforementioned exemplary requirements. Examples of such services include the transmission of measured values, status values, health information, or parameters.

According to one embodiment, the at least one specific property of the service further comprises at least one property selected from the group consisting of information relating to a receiver of the service, information relating to a sender of the service, one or more frequency bands predetermined for the processing of the service, a geographical position of the automation component, a movement signal for indicating a movement state of the automation component, a distance between a receiver and a sender, a processing condition, and costs incurred in the course of processing the service. This can enable a wide variety of services to be processed using the mobile communications interface appropriate for the particular service.

Information regarding the sender may, for example, identify what data has been sent, by whom and/or when it was sent, and/or indicate a serial number of the device from which it was sent. In logistics automation, for example, a property of the service may be a geographic location of the automation component. It is conceivable, for example, that the service should only be processed if the automation component is outside a restricted area. Alternatively to refusing to process the service, the processing of the service may also in some cases be redirected to an alternative cellular interface that may be more suitable for the request of the service, such as a cellular interface that uses frequencies that are allowed in said restricted area. The geographic location of the automation component may also be an indication of a country. Thus, for example, the control circuit can assign the respective available mobile radio interfaces to the individual services in accordance with the respective country. Another feature of the service may be a motion signal to indicate a motion state of the automation component. It may be envisaged that the automation component is equipped with an acceleration sensor and/or with a motion sensor. Furthermore, it is conceivable that the service requires the retrieval of measurement data whenever the automation component is moving and/or not moving at a certain speed. It may also prove advantageous, for example, that the fill level of a container is only measured when the container is either stationary or lying down, or when it is moving at a constant speed. Thus, a requirement of the service may be to refuse to measure the level if the automation component, which may be the level sensor, is not accelerating. In this example case, a motion signal to indicate a state of motion of the automation component may be a property of the service. Another possible property of the service may be a processing condition. It is conceivable that the service should only be processed if a predetermined condition is met. For example, the Perform software update service may be a user-dependent condition. For example, the software update may only be performed if a user has given his or her approval. Costs can also be associated with the processing of a service. For example, sending data may be associated with certain costs. Thus, a property of the service may denote costs incurred.

According to an embodiment, the provided service comprises one or more of the following: Receiving a data item from a sender, Sending a data item to a receiver, Transmitting health information of the automation component, Querying a data item of the automation component, Transmitting status information of the automation component, Performing a software update, Processing a measurement command, Processing an operator command, determining a process measurement variable, providing a measurement result, querying a measurement result, retrieving operator information, processing an operator command, querying cost information, performing a fault diagnosis, actuating one or more actuators of the automation component, and controlling one or more further automation components.

According to an embodiment, the step of determining and/or driving one of the at least two mobile radio interfaces with the control circuit further comprises a step of activating and/or deactivating one of the at least two mobile radio interfaces. Activating and/or deactivating one of the at least two mobile radio interfaces may, for example, denote switching on and/or switching off. However, it may also refer to initiating an idle and/or standby state of the mobile radio interface or ending the idle state of the mobile radio interface. It is conceivable, for example, to activate the respective mobile radio interface only when it is required for processing the service. This can save energy, for example, and can provide an energy-efficient automation component. Activating a cellular interface may include, for example, supplying electrical power and/or providing electrical power to the cellular interface. Deactivating may include turning off a power supply to the respective cellular interface.

According to an embodiment, the step of determining and/or driving one of the at least two mobile radio interfaces with the control circuit further comprises a step of transmitting to a receiver a signal predetermined for processing the service. The signal may be, for example, a measurement signal, a measurement value, a control signal, a control command or the like. For example, if the service reads "Close valve", with the valve located at the receiver, a control signal for closing the valve can be transmitted. The signal predetermined for processing the service may include information relating to the service. The signal may additionally or alternatively itself be required for processing the service. For example, if the automation component is a level measuring device, the signal predetermined for processing the service can be indicative of a measured value which is transmitted to the receiver.

Another aspect of the present disclosure relates to a computer program that, when executed by a control circuit of an automation component, instructs the automation component to perform steps of the method as described above and below.

Another aspect of the present disclosure relates to a computer-readable medium on which is stored a computer program that, when executed by a control circuit of an automation component, instructs the automation component to perform steps of the method as described above and below.

Another aspect of the present disclosure relates to an automation component for automation technology. The automation component comprises a control circuit for controlling the automation component and at least two mobile radio interfaces for data transmission. The automation component is adapted to perform steps of the method as described above and below.

The automation component can be, for example, an extension module, a gateway, an add-on module or a docking station. The automation component can, for example, be regarded as an extension module that can be coupled to an existing sensor or field device and/or can be docked to a field device via a plug-in or clip-in mechanism. It is conceivable, for example, to expand the respective field device or the respective sensor by at least one or at least two (or more) mobile radio interfaces together with an associated control circuit by means of automation components or expansion modules provided for this purpose. The automation component can also be battery-powered and thus, for example, energy-autonomous.

The two cellular interfaces can be different, for example. For example, one of the two cellular interfaces of the automation component may be an NFC interface and one of the two cellular interfaces may be a LoRa interface. The two cellular interfaces may also have different data transmission rates and/or different power requirements.

For example, the automation component may be a module or extension module that can be attached to a sensor and/or coupled to a sensor, in particular mechanically and/or communicatively coupled. A mechanical coupling of such an extension module can, for example, take place via a snap mechanism, a clip mechanism, a hook mechanism, a magnetic coupling mechanism or the like. A communicative coupling between the sensor and the extension module can be performed via one of the at least two mobile radio interfaces. Such an automation component designed as an expansion module can be used to advantageously expand an existing sensor or field device with at least one of the mobile radio interfaces.

It is conceivable, for example, that the sensor or field device communicates with the expansion module or automation component via near field communication (NFC). Such near field communication can be particularly advantageous for data transmissions with a low data transmission rate and/or relatively low data volume to be transmitted. Furthermore, it is conceivable that the automation component provides the field device with a second mobile radio interface for data transmission with a high data transmission rate and/or relatively large data volume to be transmitted, such as an LORA interface, a 3G, 4G, 5G interface or the like.

According to an embodiment, the automation component further comprises an energy storage device, such as a battery, an accumulator, a capacitor, or the like. The control circuit is further adapted to supply electrical energy to one of the at least two mobile interfaces depending on the at least one particular characteristic of the service. By using an energy storage device, the automation component can be operated in a self-sufficient and/or energy-autonomous manner. Sometimes, the automation component may also be designed to be movable or mobile. In such cases, an energy storage device can provide an energy supply for the automation component at least for a certain period of time.

In particular, in the case of automation components with energy storage, one of the mobile radio interfaces for processing the service can be controlled according to the energy requirement for processing the service and/or the amount of energy available in the energy storage in order to reduce energy consumption and/or operate the automation component in an energy-efficient manner.

According to an embodiment, the at least two mobile radio interfaces differ with respect to one or more frequencies used for data transmission. Alternatively or additionally, the at least two mobile radio interfaces differ with respect to one or more frequency ranges used for data transmission. Alternatively or additionally, the at least two mobile radio interfaces differ with respect to a bandwidth provided for a data transmission. Alternatively or additionally, the at least two mobile radio interfaces differ with respect to one or more frequency bands used for a data transmission.

According to an embodiment, the at least two mobile radio interfaces differ with respect to a data transmission rate and/or with respect to a power requirement for a data transmission. If a predetermined data transmission rate is desired or even required for the processing of a service, the appropriate mobile radio interface can be determined and/or controlled by the control circuit so that the mobile radio interface can process the service in accordance with the desired or required data transmission rate.

According to an embodiment, the at least two mobile radio interfaces differ with respect to a mobile radio standard. For example, one of the mobile radio interfaces can use a mobile radio standard with a low data transmission rate, such as UMTS, Edge, 2G, 3G, and another mobile radio interface can use a mobile radio standard for high data transmission rates, such as LTS or 5G.

The at least two mobile radio interfaces can each designate hardware interfaces that are independent of one another. Alternatively, the at least two mobile radio interfaces can be implemented in a single hardware component, but can be operated differently by appropriate control by the control circuit. For example, the at least two mobile radio interfaces can be operated in different frequencies, frequency bands and/or frequency ranges for data transmission. It should also be noted here that the automation component can have more than two mobile radio interfaces, and optionally one or more further (wireless or wired) interfaces.

According to an embodiment, the at least two mobile radio interfaces differ with regard to a power requirement for a data transmission. This may be useful if, for example, explosion safety requirements have to be met. In this case, a mobile radio interface may be preferred that comprises a limited expended energy. In contrast, mobile radio interfaces with an arbitrarily high energy requirement can be used in the field of factory automation and safety engineering, since there are often no requirements to be considered with regard to explosion safety.

According to an embodiment, the automation component further comprises a motion sensor for detecting a motion state of the automation component. For example, a specific service can be processed only if the automation component is moving at a predetermined speed or only if the automation component is not moving or is at a standstill. By providing a motion sensor, the processing of the service can thus also be made dependent on further conditions in order to be able to individually design the operation of the automation component.

Another aspect of the present disclosure relates to an automation control system. The control system comprises at least two automation components as described above and below. The automation components may be arranged to communicate with each other and/or with further components, for example via one or more mobile radio interfaces and/or further (wired or wireless) interfaces. At least one of the at least two automation components is designed as a field device for recording one or more process measured variables. The at least two automation components can, for example, be several similar sensors that can work together. Alternatively, different sensors may be part of the control system. Each of the at least two automation components can be equipped with different or the same mobile radio interface.

According to an embodiment, at least one of the at least two automation components is an operating device, in particular a mobile operating device, for operating the field device. Alternatively or additionally, at least one of the at least two automation components is a server. The server and/or the operating device can be used, for example, to observe, control, trigger and/or monitor services that are executed on an automation component. The server may be a data processing device or a server network comprising a plurality of data processing devices. The operator device can basically be any terminal device that can establish a communication link with the automation component, for example. The operator device and the automation component, which may be a field device, may be independent and/or separate devices. For example, the operator device may be a portable and/or mobile operator device. Alternatively or additionally, the operator device may be a tablet PC, a smartphone, a laptop, and/or a computer. In particular, the operator device may be arranged for wireless communication with the automation component. Alternatively or additionally, however, the operating device can also be set up for wired communication with the automation component, for example via a bus connection.

Another aspect of the present disclosure relates to the use of an automation component for process automation and/or factory automation as described above and below, and/or the use of a control system for process automation and/or factory automation as described above and below.

In the following, embodiments of the invention are described with reference to the figures.

Elements in the figures that are similar, appear similar, appear the same or have the same effect are given similar or the same reference signs. The figures are merely schematic and not to scale.

DETAILED DESCRIPTION OF EMBODIMENT EXAMPLES

Figure 1A:
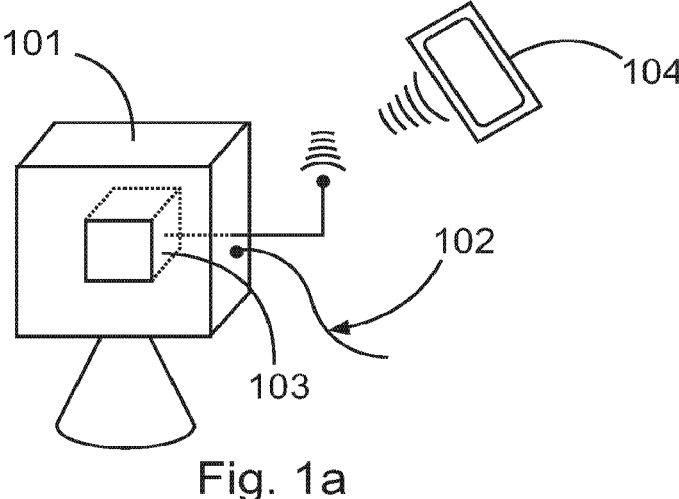
FIGS. 1a to 1c schematically show automation components according to the state of the art.
Figure 1B:
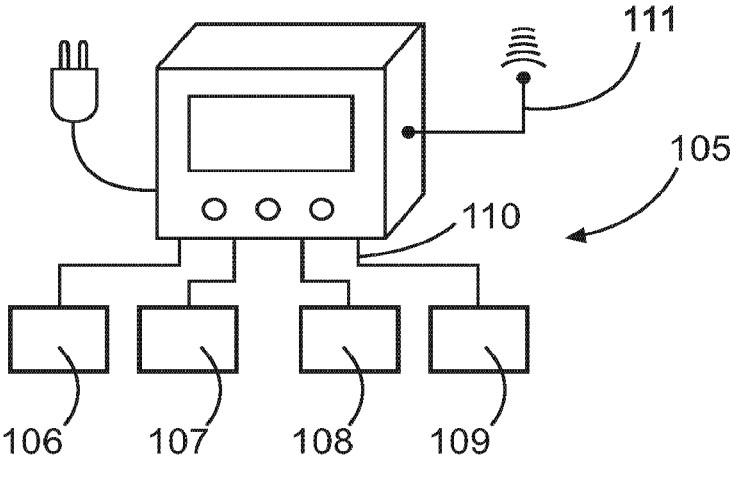
Figure 1C:
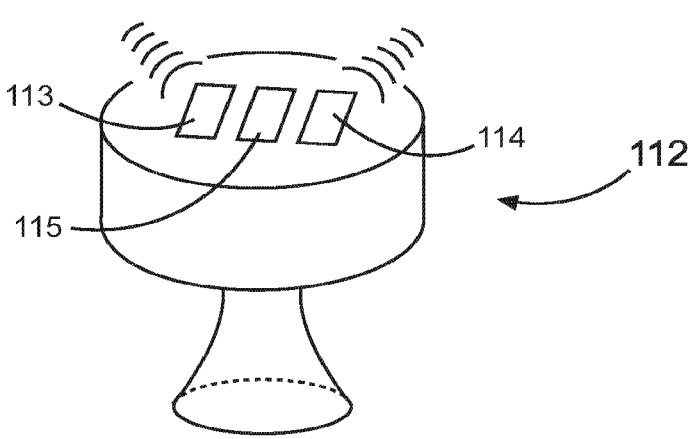

FIGS. 1a to 1c schematically show automation components.

The automation component 101 may, for example, be a level sensor and have a communication interface 102, which may, for example, be a HART interface.

A service for the automation component may be, for example, "determining and providing a level value" via the interface 102. For this service, data may be transmitted via the (wired) interface 102, for example with high latency and/or low data transmission rate.

Further services may concern and/or be, for example, "firmware update" or "device operation" or "fault diagnosis". For such services, a further interface 103 with a high data rate and short latency can be provided, such as a Bluetooth interface 103, via which the aforementioned services can be provided and utilized in interaction with an operating device 104, such as a smartphone 104.

The automation component 105, as shown in FIG. 1b, may for example be a programmable logic controller 105. A first service here can be the generation, provision and/or output of control commands for an actuator 109 at an interface 110. For this purpose, data of various further automation components 106, 107, 108 may be read and/or provided. The automation components 106, 107, 108 can also be controlled.

If, for example, online monitoring of the control-relevant parameters is to be implemented as a further service, an interface 111, such as a mobile radio interface 111 and/or a mobile radio modem 111, can be installed, via which large amounts of data can be provided and transmitted wirelessly.

FIG. 1c shows an example of an automation component 112 designed as a self-sufficient level sensor 112, which may for example have an energy storage 115, such as a battery 115 or an accumulator. The automation component 112 can, for example, provide a first service "determine filling level" at a wireless interface 113, such as a LoRa interface 113, which can combine a long range with low energy consumption, and thus can enable a long service life of the battery 115. Fast data transfers are not possible via this interface 113. Therefore, at least one further interface 114 may be provided for further services, such as "firmware update" or "device operation" or "fault diagnosis". The interface 114 may comprise, for example, a Bluetooth module 114.

Figure 2:
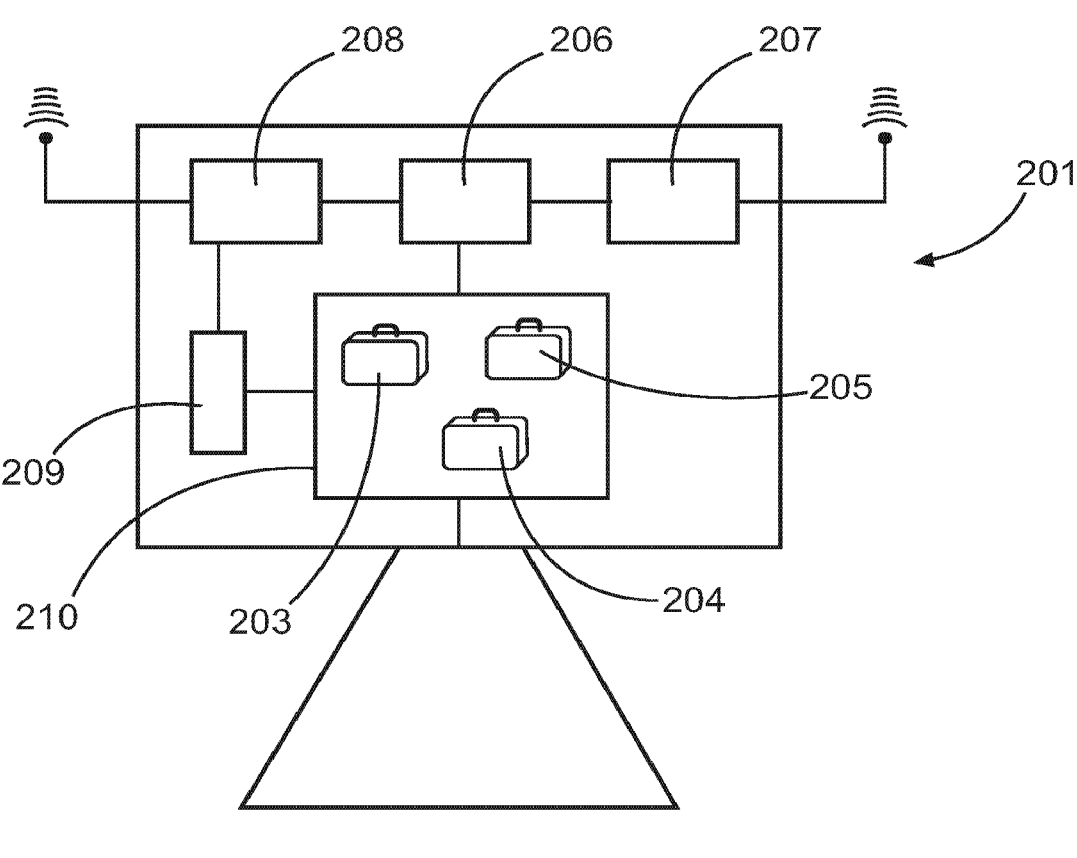
FIG. 2 schematically shows an automation component according to an embodiment example.

FIG. 2 schematically shows an automation component 201 according to an embodiment example. Unless otherwise described, the automation component 201 of FIG. 2 may comprise all elements and features of one or more of the automation components 101, 105, 112 described with reference to FIGS. 1a to 1c.

The automation component 201 of FIG. 2 is an example of a level measuring device. The level meter 201 includes a control circuit 206 and at least two mobile interfaces 207, 208. The control circuit 206 may be part of and/or coupled to a main electronics 210. The control circuit 206 is adapted to analyze one or more services 203, 204, 205 and derive and/or determine at least one property of the service. Based on the determined property, the control circuit 206 may determine and/or control one, only one, or both of the mobile interfaces 207, 208 for at least partially processing the service 203, 204, 205, for example by means of software commands.

The at least two mobile radio interfaces 207, 208 may differ with respect to one or more frequencies used for a data transmission, with respect to one or more frequency ranges used for a data transmission, with respect to a bandwidth provided for a data transmission, with respect to one or more frequency bands used for a data transmission, with respect to a data transmission rate, with respect to a power requirement for a data transmission, and/or with respect to a mobile radio standard used by the respective mobile radio interface 207, 208.

Optionally, the automation component 201 may include an energy storage device for supplying energy 209.

The automation component 201 may implement services, jobs and/or services 203, 204, 205 in interaction of different hardware and software units within the main electronics 210 of the automation component. The automation component services 203, 204, 205 are shown in FIG. 2 in the form of hand cases. The hand cases represent the services 203, 204, 205, which may also be referred to as jobs in the context of the present disclosure. Examples of the services may be "determine and provide a level value" 203, "perform a firmware update" 204 or also "interact with a user" 205. Depending on the particular service to be implemented or processed, the control circuit 206 may activate a cellular interface 207, 208 appropriate to the service based on the at least one determined property of the particular service 203, 204, 205.

The term "matching the service" is to be understood broadly in this context. This may mean that the activation of one of the two mobile interfaces 207, 208 or the selection of the mobile interface by means of an analyzing the service is based on at least one property of the service. The property of the service may be a latency predetermined for processing the service, a data amount predetermined for processing the service, an energy requirement predetermined for processing the service, and/or frequencies predetermined for processing the service. It may be any number of other properties of the service that identify and/or characterize the service.

In the case of the service "Determine and provide a level value" 203, for example, a particularly energy-saving mobile radio interface 207 with a high range, such as may be defined by LTE-CAT NB1 or also NB-IoT, can be activated by the control circuit 206. This leads to a high saving of energy in the control mode of the level measuring device 201, which can be advantageous in particular in the environment of process measurement technology or with battery-operated sensors.

If, on the other hand, the "perform firmware update" service 204 is activated, the control circuit 206, also referred to as a selection unit in the context of the present disclosure, can activate and/or drive a mobile radio interface 208, for example a UMTS mobile radio interface, which enables a high data throughput. The higher operating current of the one mobile radio interface 208 required for this purpose can optionally be provided temporarily for the relatively short period of a software update from an energy storage device 209, such as a battery, installed in the level measuring device 201, either completely or in a supporting manner.

When the service "interaction with a user" 205 is activated, in particular the latency of a data transmission, i.e. the time between sending the data packet in the level meter 201 and receiving the data packet at an operator terminal or receiver, may adversely affect the ease of use during an online operation. Therefore, when the service 205 is activated, the control circuit 206 may activate a cellular interface 208 that guarantees particularly low latency, for example, an LTE-CAT M1 cellular interface.

It may be provided that the control circuit 206 activates the appropriate mobile radio interface 207, 208 by software commands. It may also be provided that the mobile radio interface 207, 208 is activated by hardware signals. In particular, it may be provided that, in order to implement energy-saving circuits, the components or mobile radio interfaces 207, 208 that are not required are de-energized by disconnecting the respective supply lines.

The at least two mobile radio interfaces 207, 208 may be different, but may also be identical. The at least two mobile radio interfaces 207, 208 may be implemented in a common hardware interface or may be designed as separate or independent hardware components. The at least two mobile radio interfaces 207, 208 may differ with respect to certain parameters and may be similar with respect to other parameters. For example, the at least two mobile radio interfaces 207, 208 may originate from different generations 2G, 3G, 4G, 5G of standardized mobile radio technologies, but may also originate from identical generations.

It may be envisaged, for example, that the mobile radio interfaces 207, 208 differ in terms of the mobile radio standard used. This may result in the use of different frequencies and/or frequency bands for data transmission and, where applicable, differences in the data transmission rate, range and/or latency. Alternatively, however, it may also be envisaged to use both mobile radio interfaces 207, 208 in the same mobile radio standard, but to operate them at least partially different frequencies and/or frequency bands. The latter can be used in an advantageous manner, especially for newer generations of cellular standards, such as LTE or 5G. In this way, the automation component 201 can be adapted to diverse circumstances and/or requirements and operated in an optimized manner.

In the following, the available mobile radio interfaces 207, 208 in the area of the 5th generation mobile radio standard (5G) are classified and characterized by way of example, but in no way restrictively. In a first area, 5G technologies for the realization of IoT (Internet of Things) applications can be defined under the keyword enhanced Machine Type Communication (eMTC). The cellular interfaces associated with this area, such as NB-IoT, may be suitable for transmitting a few bytes over long distances while maintaining excellent building penetration and extremely low power consumption. This technology is particularly advantageous for transmitting measured values, status values, health information or parameters and for processing and/or performing the corresponding services. In addition, transmissions according to this standard are usually particularly cost-effective, which can reduce the operating costs of the sensor or automation component 201. In order to realize the required ranges, mobile radio interfaces 207, 208 from this range usually use frequencies between 100 MHz and 1 GHz.

On the other hand, if a service requires reliable transmission of measured values with a predefined maximum allowable transmission time, the control circuit 206 may activate an ultra Reliable Low Latency (uRLLC) technology from 5G, for example a CAT-M1 technology. Cellular interfaces in this category can guarantee maximum latency in the range between typically 10 ms and a few seconds, and are also suitable for transmitting small amounts of data at slightly increased power consumption. In particular, this technology can be used to implement services 203, 204, 205 such as the transmission of measured values, for example when the measured values are time-critical for the implementation of a control system within a PLC 105 and must be available in a predefinable time. Another field of application relates to user interaction in the context of commissioning, maintenance or parameterization, in which small latency times can lead to a particularly high level of user comfort in the context of user interaction. Mobile radio interfaces from this category usually use frequencies between 1 GHz and 4 GHz to transmit the data.

A third area of the 5th generation cellular standard may involve cellular interfaces for implementing enhanced Mobile Broadband (eMBB) requirements, for example through 5G NR. Cellular interfaces 207, 208 in this category are characterized by a high data rate with accompanying high power requirements and increased cellular tariff costs. Therefore, the control circuit 206 will only activate this cellular interface when functionally required to process a corresponding service, for example in the context of providing a firmware update service. Cellular interfaces from this range can operate with a high bandwidth typically at frequencies between 1.9 GHz and 3.8 GHz and/or above 6 GHz and/or above 24 GHz.

After the service 203, 204, 205 from one of the at least two cellular interfaces 207, 208 has been processed, the respective activated cellular interface may be deactivated by the control circuit 206.

Figure 3:
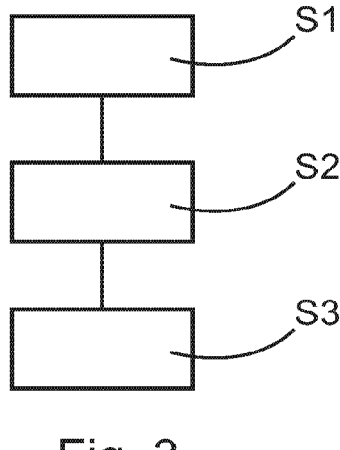
FIG. 3 shows a flowchart illustrating steps of a process according to an embodiment.

FIG. 3 shows a flow chart illustrating the steps of a method for controlling and/or operating an automation component of automation technology. The automation component can in particular be an automation component according to FIG. 2.

In a step S1, a service of the automation technology is provided. In this process, the service may be received, sent and/or retrieved. For example, the service may have been sent by a mobile operating device such as a smartphone and may be received by the automation component. It may, for example, be a measured value query or the like.

In a further step S2, while determining at least one characteristic of the service, the service is analyzed and/or examined by the control circuit 206. Analyzing the service may include, for example, associating the service with a subfield of automation technology. Analyzing the service may alternatively or additionally include examining requirements associated with the service. In step S2, it may basically be a matter of analyzing the service that has been received, sent and/or retrieved so that the predetermined properties of the service that are relevant for the processing of the service can be determined.

The property of the service can basically be any parameter that identifies and/or characterizes the service. Examples of properties of services include a latency predetermined for processing the service, an amount of data to be transmitted predetermined for processing the service, a data transfer rate predetermined for processing the service, an energy requirement predetermined for processing the service, a frequency predetermined for processing the service, a plurality of frequencies predetermined for processing the service, and/or one or more frequency bands predetermined for processing the service. The frequency predetermined for processing the service and/or one or more frequency bands predetermined for processing the service may have an impact on the choice of generation (such as 2G, 3G, 4G, 5G) of the particular cellular interface.

For example, in the case of the "Determine and provide a level value" service, the characteristics of the service may be considered to be low power requirements and/or long range.

Another example of a property of the service can be a geographical position of the automation component. Thus, for example, based on the country in which the automation component is located at the time the service is processed, one of the at least two cellular interfaces can be determined in the next step.

In a step S3, one of the at least two cellular interfaces 207, 208 is determined and/or controlled with the control circuit 206 to process the service based on the at least one particular characteristic of the service. In other words, the selection of the cellular interface 207, 208 between one of the at least two cellular interfaces is based on the at least one characteristic of the service. Based on the analysis of the service and/or the at least one property of the service, the control circuit 206 may decide which of the at least two cellular interfaces 207, 208 is selected, driven, and/or activated for processing the service. Therefore, the control circuit 206 may also be considered a cellular interface selection unit.

The step of determining and/or driving one of the at least two cellular interfaces 207, 208 may further be based on input from a user.

It may also be provided that the determination of one of the at least two mobile radio interfaces 207, 208 depends on the availability of corresponding prepaid credit for the respective mobile radio interface in the automation component. In this case, costs incurred in the course of processing the service may be regarded as a property of the service. It is therefore conceivable that if the prepaid credit of a first mobile communications interface 207 is exhausted, a service can continue to be offered via another mobile communications interface 208.

In principle, the control circuit 206 can be configured in such a way that it determines one of the at least two mobile radio interfaces 207, 208 in an optimized manner depending on the service to be processed and/or its properties. It is conceivable that as long as no service is being processed, the at least two mobile radio interfaces can be in an idle mode or are deactivated. In this case, triggering one of the two mobile radio interfaces may comprise activating or starting.

The service is processed by the particular mobile interface 207, 208 in step S3. In this context, the processing of the service may denote the execution and/or the execution of at least a part of the service. If the service is "determine fill level", the processing of the service may include the actual determination of the measured fill level at a receiver based on a transmit signal.

Figure 4:
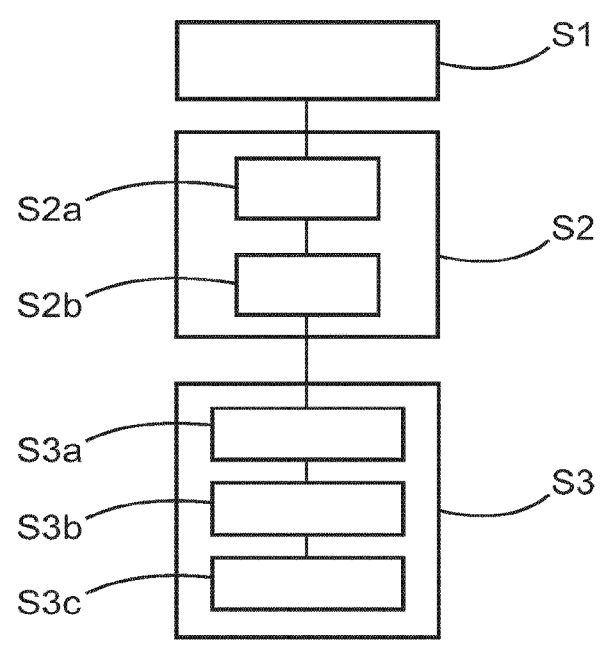
FIG. 4 shows a flowchart illustrating steps of a process according to an embodiment.

FIG. 4 shows a flow chart illustrating steps of a method for controlling and/or operating an automation component 201 of automation technology. Unless otherwise described, the method of FIG. 4 has the same steps as the method of FIG. 3.

After the service is provided in step S1, it is analyzed S2 by the control circuit 206. For this purpose, at least one property of the service is determined. For example, in the embodiment example of FIG. 4, an optional sub-step S2*a* of the step of analyzing S2 first determines a latency predetermined for processing the service. In other words, it can be analyzed or checked whether the requested service is critical with regard to the latency time If so, the step of determining and/or activating S3 can be executed. In this example, the mobile radio interface LTE-CAT M1 can be activated S3*a*. Thereupon, in step S3*b*, the service is processed and finally the mobile radio interface is deactivated S3*c*.

Alternatively, if the latency is not of increased relevance for the provided service, in a step S2*b* it can be analyzed and/or checked whether large amounts of data need to be transmitted, and a corresponding and/or suitable mobile radio interface 207, 208 can be selected. If this is the case, the step of determining and/or triggering S3 can be executed. In this case, for example, the mobile radio interface UMTS can be activated in step S3*a*. The service is processed in step S3*b* before the UMTS is deactivated again in step S3*c*.

If, when analyzing the service S2, it turns out that neither the latency nor the amount of data is critical with regard to the service to be processed, the respective service can, for example, be processed using an energy-optimized NB-IoT cellular interface. However, the Substep S3*c* may be optional. The enabled cellular interface may remain enabled without processing a service. Alternatively or additionally, it is conceivable that the activated mobile radio interface is automatically deactivated after a certain time.

Steps S2*a* and S2*b* may relate to further properties of the service. Any number of further substeps of determining a property of the service may alternatively or additionally be performed as part of the step of analyzing the service. For example, Substep S2*a* may analyze or verify whether a high data rate is required to process the service according to its requirements. Alternatively or additionally, analyzing the service while determining a data transfer rate predetermined for processing the service may be performed in a further sub-step.

Figure 5:
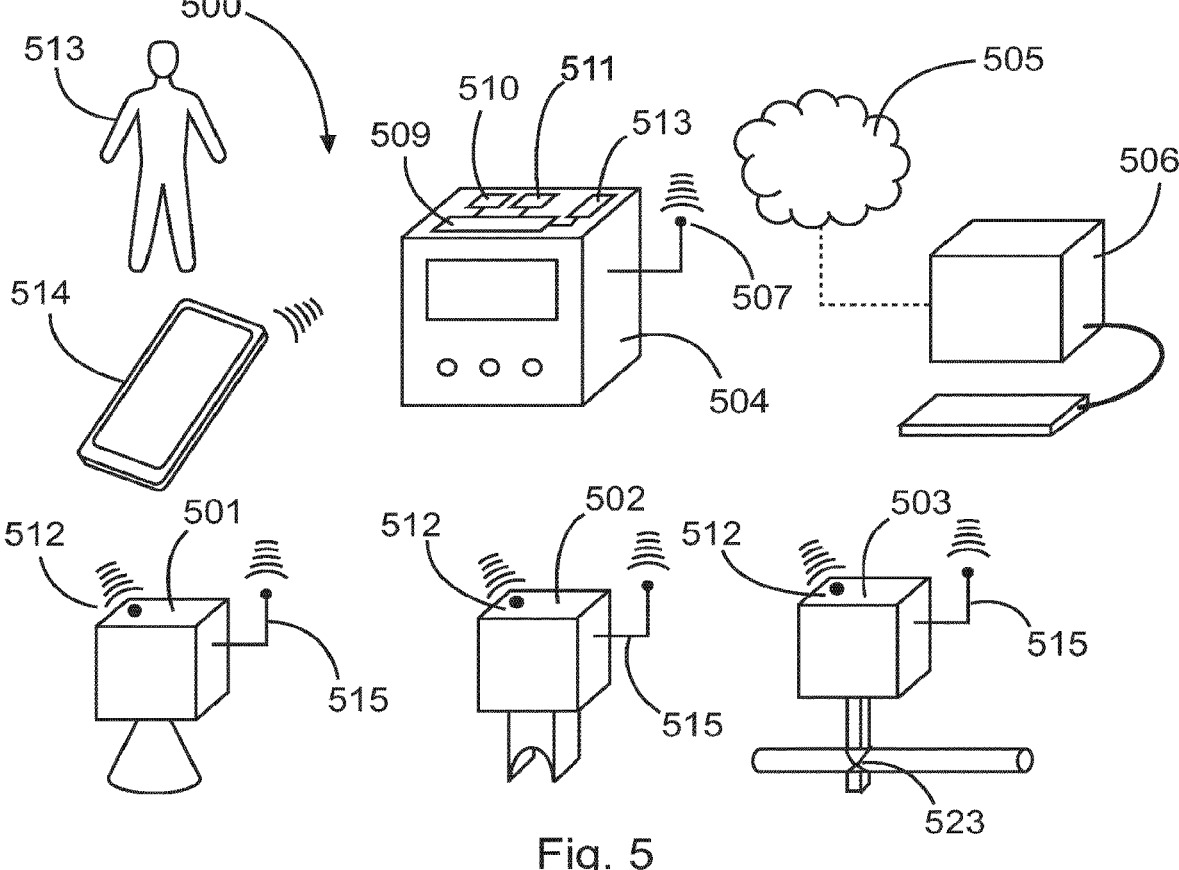
FIG. 5 schematically shows a control system according to an embodiment.

FIG. 5 schematically shows a control system 500 and/or automation system 500 according to an embodiment.

The automation system 500 has a plurality of automation components 501, 502, 503, 504, 505. Two of the automation components 501, 502, 503, 504, 505 are exemplary field devices 501, 502 for acquiring measured values. One of the plurality of automation components is further a server 505. In addition, the automation system 500 may comprise an operator device 514, 506, such as a smartphone 514 or a server 506. Using the operator device, a user 513 may control, monitor, and/or evaluate the various automation components, such as sending services, retrieving services, and/or evaluating measured values.

For example, component 501 may be a radar sensor 501 and component 502 may be a limit level sensor 502, which may transmit the measured values obtained in the "determine level" and "determine limit level" service to the automation component 504 via a uRLLC-based cellular interface 515 by activating a corresponding cellular interface 512, 515 using the cellular network.

The automation component 504 may monitor and/or receive the transmitted, for example, values in real time, for example, to close an actuator 503, such as a valve 523, in the event of an impending overfill of a container. The corresponding "close valve" service of the actuator 503 may in turn be engaged by the automation component 504 using a uRLLC-based cellular interface by activating a matching cellular interface 510 using the control circuitry 509.

Optionally, one or more, such as all, automation components 501, 502, 503, 504 may be interactively operated by an on-site user 513 using a wireless cloud access device 514, such as a smartphone 514.

As part of an additional service, the automation component 504, which in this example may have an evaluation unit, may periodically store status and health information of the entire automation system 500 in a server 505, or in a cloud 505. Since latency is unimportant in this regard, an eMTC based cellular interface such as NB-IoT 507 may be used for this purpose by activating the cellular interface 511. The status and health information can be monitored and evaluated at any office workstation 506.

Furthermore, both the automation component 504 and the sensors or the automation components 501, 502, 503 have mobile radio interfaces 512, which can be assigned to the area of the eMBB. Via this mobile radio interface, the automation components can be supplied with new firmware versions remotely, for example via the cloud 505 and the PC 506.

It should be additionally noted that different mobile radio interfaces 507, 510, 511, 512, 515 may operate at different frequencies of the respective mobile radio signals. As a result, multiple electronic units 513 may be required to provide the respective mobile radio interfaces. However, it may also be envisaged to integrate a single multi-band electronic unit in the automation components 501, 502, 503, 504, which can then provide different mobile radio interfaces. Provision may be made to incorporate different antennas for the different cellular interfaces. Alternatively, a single multi-band antenna 515 may be provided to implement different cellular interfaces.

In an embodiment of the invention, it may be additionally or alternatively provided to extend already existing embodiments 101, 105, 112 of automation components by at least one or also at least two mobile radio interfaces 207, 208 together with an associated control circuit 206 by means of extension modules provided for this purpose.

Supplementally, it should be noted that "comprising" and "having" do not exclude other elements or steps, and the indefinite articles "a" or "an" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A method for controlling and/or operating an automation component of automation technology, the automation component being a level measuring device for detecting a level of a medium, or an add-on module for a level measuring device, or a pressure measuring device for detecting a pressure of a medium, and/or a flow measuring device for detecting a flow of a medium, and having control circuitry and at least two mobile radio interfaces, the method comprising:

applying an automation technology service;

analyzing the service by the control circuitry to determine at least one characteristic of the service; and selecting and/or driving, based on the at least one determined characteristic of the service, one of the at least two mobile interfaces with the control circuitry to process the service, wherein the at least one particular characteristic of the service comprises a latency predetermined for processing the service and/or an amount of data to be transmitted in the course of processing the service and/or a data transfer rate predetermined for processing the service and/or an energy demand predetermined and/or expected for processing the service.

2. The method according to claim 1, wherein applying the service of automation technology includes receiving, transmitting, and/or retrieving the service.

3. The method according to claim 1, wherein the analyzing the service includes determining a latency predetermined for processing the service, and/ or wherein the at least one particular characteristic of the service includes a latency predetermined for processing the service.

4. The method according to claim 1, wherein the analyzing the service includes determining an amount of data to be transmitted in the course of processing the service, and/or wherein the at least one particular characteristic of the service comprises an amount of data to be transmitted in the course of processing the service.

5. The method according to claim 1, wherein the analyzing the service includes determining a data transfer rate predetermined for processing the service, and/or wherein the at least one particular characteristic of the service comprises a data transfer rate predetermined for processing the service.

6. The method according to claim 1, wherein the analyzing the service includes determining a predetermined and/or expected energy demand for processing the service, and/or wherein the at least one particular characteristic of the service comprises an energy requirement predetermined and/or expected for the processing of the service.

7. The method according to claim 1, wherein analyzing the service includes determining one or more frequencies predetermined for processing the service and/or at least one frequency range predetermined for processing the service, and/or wherein the at least one particular characteristic of the service comprises at least one frequency predetermined for processing the service and/or at least one frequency range predetermined for processing the service.

8. The method according to claim 1, wherein the at least one particular characteristic of the service further comprises at least one characteristic selected from the group consisting of: information relating to a receiver of the service, information relating to a sender of the service, one or more frequency bands predetermined for processing the service, a geographical position of the automation component, a movement signal for indicating a movement state of the automation component, a distance between a receiver and a sender, a processing condition, and costs incurred in the course of processing the service.

9. The method according to claim 1, wherein the provided service includes one or more of the following elements:
receiving a data item from a sender,
sending a data item to a receiver,
transmitting health information of the automation component,
querying a data item of the automation component,
transmitting status information of the automation component, performing a software update,
processing a measurement command,
processing an operator command,
determining a process measurement variable,
providing a measurement result,
querying a measurement result,
retrieving operator information,
processing an operator command,
querying cost information,
performing a fault diagnosis,
actuating one or more actuators of the automation component, and
controlling one or more further automation components.

10. The method according to claim 1, wherein the selecting and/or driving one of the at least two mobile interfaces with the control circuitry further includes:
enabling and/or disabling one of the at least two mobile interfaces.

11. The method according to claim 1, wherein the selecting and/or driving one of the at least two mobile interfaces with the control circuitry further includes:
transmitting to a receiver a signal predetermined for processing the service.

12. A non-transitory computer readable medium having stored thereon a program which, when executed by a control circuitry of an automation component, instructs the automation component being a level measuring device for detecting a level of a medium, or an add-on module for a level measuring device, or a pressure measuring device for detecting a pressure of a medium, and/or a flow measuring device for detecting a flow of a medium, and having control circuitry and at least two mobile radio interfaces to perform a method for controlling and/or operating the automation component of automation technology, the method comprising:
applying an automation technology service;
analyzing the service by the control circuitry to determine at least one characteristic of the service; and
selecting and/or driving, based on the at least one determined characteristic of the service, one of the at least two mobile interfaces with the control circuitry to process the service,
wherein the at least one characteristic of the service comprises a latency predetermined for processing the service and/or an amount of data to be transmitted in the course of processing the service and/or a data transfer rate predetermined for processing the service and/or an energy demand predetermined and/or expected for processing the service.

13. An automation component being a level measuring device for detecting a level of a medium, or an add-on module for a level measuring device, or a pressure measuring device for detecting a pressure of a medium, and/or a flow measuring device for detecting a flow of a medium for automation technology, comprising:
a control circuitry; and
at least two mobile radio interfaces for data transmission,
wherein the control circuitry is configured to
apply an automation technology service,
analyze the service by the control circuitry to determine at least one characteristic of the service, and
select and/or drive, based on the at least one determined characteristic of the service, one of the at least two mobile interfaces to process the service, wherein the at least one characteristic of the service comprises a latency predetermined for processing the service and/or an amount of data to be transmitted in the course of processing the service and/or a data transfer rate predetermined for processing the service and/or an energy demand predetermined and/or expected for processing the service.

14. The automation component according to claim 13, further comprising an energy storage device, wherein the control circuitry is further configured to supply electrical power to one of the at least two mobile radio interfaces in response to the at least one particular characteristic of the service.

15. The automation component according to claim 13, wherein the at least two mobile radio interfaces differ with respect to:

one or more frequencies used for data transmission, and/or one or more frequency ranges used for data transmission, and/or a bandwidth provided for a data transmission, and/or one or more frequency bands used for a data transmission.

16. The automation component according to claim 13, wherein the at least two mobile radio interfaces differ with respect to a data transmission rate, with respect to a power requirement for a data transmission, and/or with respect to a mobile radio standard.

17. The automation component according to claim 13, further comprising:

a motion sensor configured to detect a motion state of the automation component.

18. A control system of automation technology, comprising:

at least two automation components according to claim 13, wherein at least one of the at least two automation components is a field device configured to detect one or more process measurement variables.

19. The control system of claim 18, wherein at least one of the at least two automation components is a mobile operating device for operating the field device, and/or wherein at least one of the at least two automation components is a server.

* * * * *